United States Patent [19]
Russell et al.

[11] Patent Number: 4,855,813
[45] Date of Patent: Aug. 8, 1989

[54] TELEVISION IMAGE PROCESSING SYSTEM HAVING CAPTURE, MERGE AND DISPLAY CAPABILITY

[76] Inventors: David P. Russell, 10 Swan Pl., Nissequogue, N.Y. 11780; Raymond C. Papworth, 82 Wimpole Road, Barton, Cambridge CB37AD, England

[21] Appl. No.: 131,992

[22] Filed: Dec. 11, 1987

[51] Int. Cl.$^4$ .......................... H04N 9/74; H04N 5/45
[52] U.S. Cl. ...................... 358/22; 358/183; 358/903
[58] Field of Search .......................... 358/22, 183, 903

[56] References Cited

U.S. PATENT DOCUMENTS

| | | | |
|---|---|---|---|
| 3,875,329 | 4/1975 | Nagel | 358/903 |
| 4,357,624 | 11/1982 | Greenberg | 358/22 |
| 4,425,581 | 1/1984 | Schweppe et al. | 358/183 |
| 4,660,070 | 4/1987 | Nishi et al. | 358/22 |
| 4,680,622 | 7/1987 | Barnes et al. | 358/22 |
| 4,746,983 | 4/1988 | Hakamads | 358/183 |

Primary Examiner—John W. Shepperd
Attorney, Agent, or Firm—Bryan, Cave, McPheeters & McRoberts

[57] ABSTRACT

A television image processing system in which images from any composite or component RGB video source (26) may be fed into a signal processing circuit (60) where they are digitized for processing in real time, then reconverted to analog form and displayed on an RGB analog television screen (22). During this process, users can capture a frame of the digitized video at random and store it in digitized format as a full size image in the memory (32) of the graphics coprocessors (20). In order to store live or full motion video (26) in the memory (32), the memory read signal from the graphics coprocessor is intercepted (84) in response to a grab control (54) and a memory write signal substituted therefore, with the captured video then being written written to the memory (32) from the video buffer (86) through which it passes. Multiple variable size windows may be created and overlayed in the composite display (22), with each window being independent in size and content. The resultant composite television display (22) may have multiple still frame images overlayed over full motion or live video together with graphics and/or text. Separate color processing circuits (60a, 60b, 60c) are provided for parallel processing of the red, blue and green components of captured full color video to enhance the color resolution, with a separate graphics coprocessor (20a, 20b, 20c) and memory (32a, 32b, 32c) being in each circuit (60a, 60b, 60c).

46 Claims, 10 Drawing Sheets

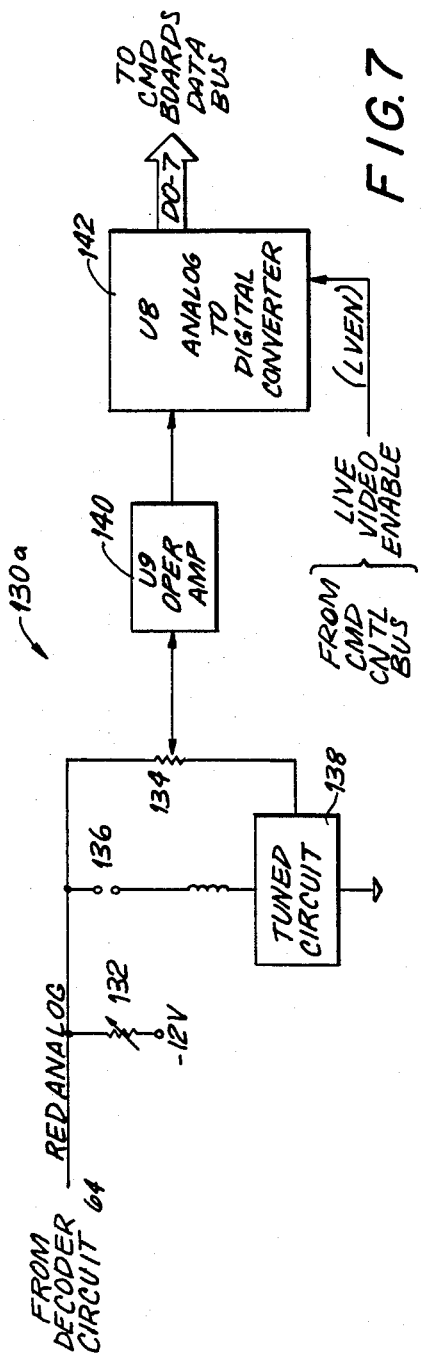
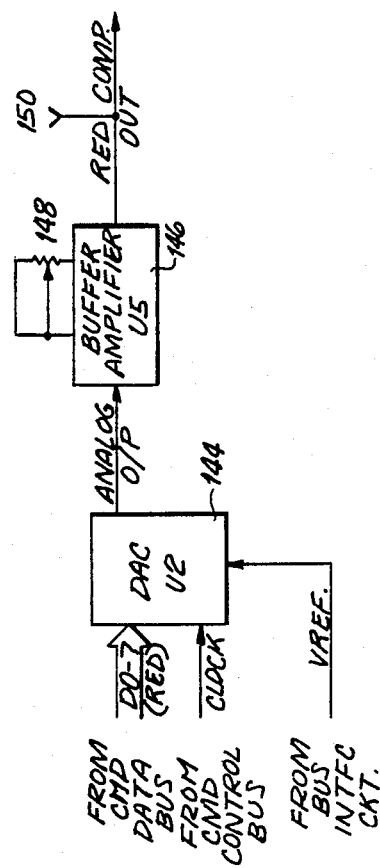
FIG. 7
FIG. 8

TELEVISION IMAGE PROCESSING SYSTEM HAVING CAPTURE, MERGE AND DISPLAY CAPABILITY

BACKGROUND OF THE INVENTION

1. Field of the Invention

The present invention relates to television image processing systems and particularly to such systems having frame capture, merge and display capability for providing a user controllable composite video display having a user selectable combination of full motion video, still video images in user controllable variable windows, graphics and/or text.

2. Description of the Prior Art

Although there are prior art image processing systems capable of capturing multiple video images and providing a composite display therefrom such as the Magnavox Digital Stereo 4 Head VHS HQ VCR which enables the user to break the television screen into four fixed windows to enable a display of three still video images and one live video image, there are none known to applicants which has the flexibility of unlimited windows having user controllable variable size and location in the composite with full size instantaneous image capture and storage for providing user controllable merging of still video images in these windows with graphics, text and/or live full motion video in an efficient and economical system, particularly one capable of providing high resolution color images. Image manipulation to provide variable size window computer generated images are well known, such as available by use of the 82786 graphics coprocessor available from Intel. However, this coprocessor has never been used before with live video images in a system to provide instantaneous grabbing of these images at random under user control. This is so despite it having been known that the 82786 graphic output can be combined with output from other video sources such as broadcast TV, video recorders, and video laser disc players. Other prior art systems lacking the full system flexibility of the present invention are the Truevision line of microcomputer graphics hardware and software available from AT&T, including the VISTA and TARGA Videographics Adapters, and the image capture board available from VuTech which is capable of overlaying a captured image in an EGA format over a moving image in a variable size and location but with limited color resolution. Still another prior art image processing system having limitation on its flexibility is disclosed in U.S. Pat. No. 4,700,181 which is a graphics display system for creating composite displays of stored image segments line by line in an iterative process using slices to build up the composite image. Thus, none of these prior art systems have the desired efficiency and economics of the present invention.

DISCLOSURE OF THE INVENTION

The present invention relates to an image processing system capable of selectively merging graphics, text, digitized video frames and/or full motion video from any composite or RGB component video source, such as live video, video camera, video laser disc or video cassette recorder, into a user selectable composite television display in which a number of windows may be overlayed with the windows having variable size and location under user control. One of the windows or the background may contain motion video. A graphics coproessor controls the manipulation and retrievable storage of instantaneously grabbed full motion video images which are digitized and stored full size in a memory for enabling selective merger of the images with the graphics, text and full motion video in the composite television display. In order to store the instantaneously grabbed ful motion video, such as live video, the read memory control signals from the graphics coprocessor are intercepted and write memory control signals are substituted therefor, thus, fooling the graphics coprocessor such as the Intel 82786, into writing to memory when it thinks it is reading. In order to enhance the color resolution of the captured and, ultimately, retrieved still video images, when the full motion video input, such as live video, is a full color signal, the input signal is decoded into its red, blue and green components and is digitally processed in parallel by individual graphics coprocessors, and is recombined upon retrieval to provide a high resolution color display, thereby providing the same range of color resolution as in the normal color television picture.

BRIEF DESCRIPTION OF THE DRAWINGS

FIG. 7 is a functional block diagram, partially in schematic, of a typical analog to digital converter circuit for use with the system of FIGS. 3 and 5, illustrating processing of the red color component of the color video signal;

FIG. 8 is a functional block diagram, partially in schematic, of a typical digital to analog converter circuit for the red color component of the color video signal for use with the system of FIGS. 3 and 5;

BEST MODE FOR CARRYING OUT THE INVENTION

Figure 1:
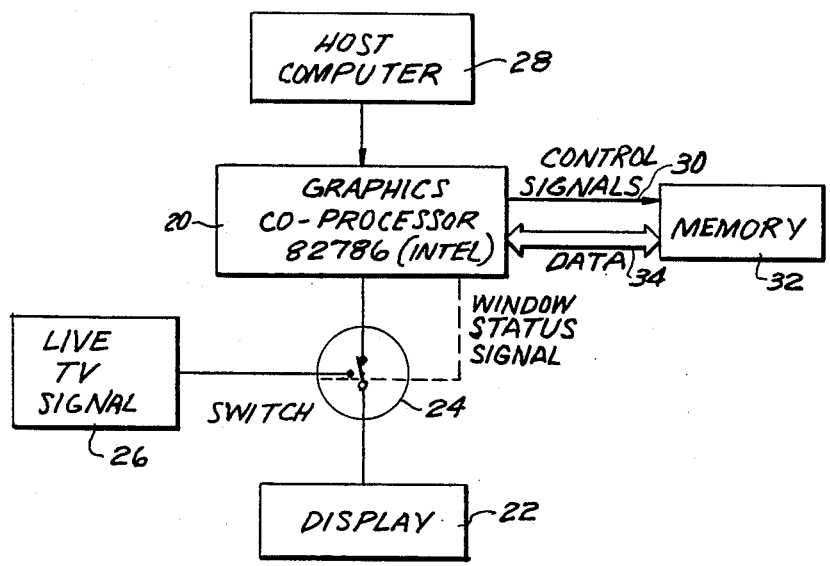
FIG. 1 is a functional block diagram of a prior art configuration for an Intel 82786 graphics coprocessor for combining live video and graphics.
Figure 2:
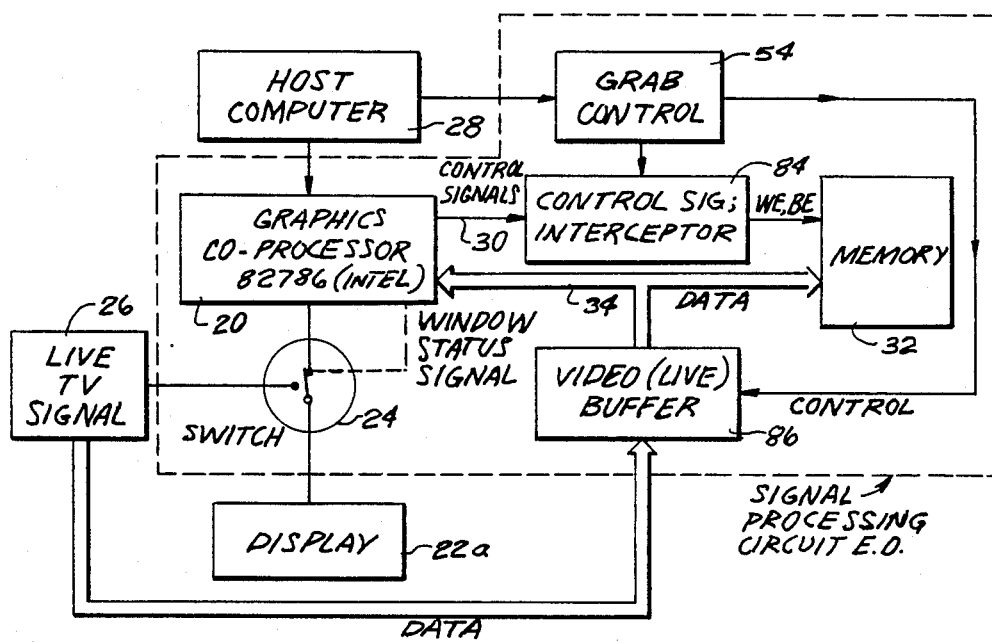
FIG. 2 is a functional block diagram, similar to FIG. 1, of a presently preferred embodiment of the present invention illustrating a new utilization for an Intel 82786 graphics coprocessor in a configuration capable of instantaneous capture of live full motion video images.
Figure 3:
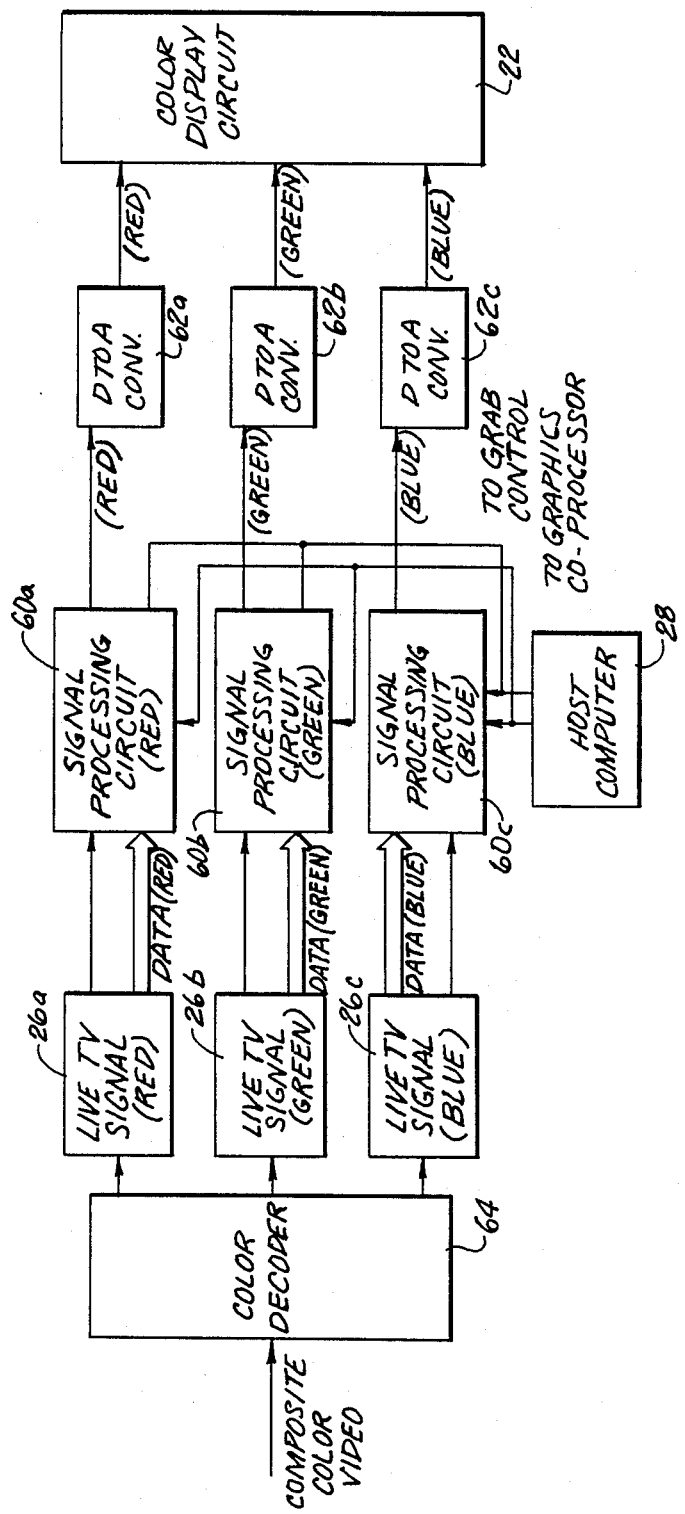
FIG. 3 is a functional block diagram, similar to FIG. 2, of a presently preferred embodiment of the image processing system of the present invention for providing high resolution color image capture of live full motion color video images.

Referring now to the drawings in detail, and initially to FIG. 1, FIG. 1 illustrates a conventional prior art configuration for the Intel 82786 graphics coprocessor 20 employed as a video interface, such as described in Chapter 6 of the 1987 edition of the 82786 Graphics Coprocessot User's Manual, the contents of which is hereby specifically incorporated by reference herein in its entirety. As shown in FIG. 1, the graphics coprocessor 20 is connected to a CRT monitor or display 22 through a video switch 24 which also receives a live television signal input 26 which may be combined with the graphic output from the graphics coprocessor 20, such as described in section 6.8 of the above User's Manual, as long as the graphics coprocessor 20 is locked in synchronization with the live video source 26. As further shown in FIG. 1, the graphics coprocessor 20 is normally under control of a conventional host computer 28, with the graphics coprocessor 20 normally providing memory read control signals via control path 30 to the memory, such as a dynamic random access memory or DRAM 32, associated with the graphics coprocessor 20 with data bidirectionally passing between the graphics coprocessor 20 and the DRAM 32 via data path 34. As described in section 6.5 of the above User's Manual, combining multiple 82786s in a system can provide greater resolution of colors than a system having one 82786, such as the prior art system of FIG. 1. In the above prior art system, there is no provision for instantaneous grabbing of a full motion video signal such as the live video signal 26 so that still video images in multiple windows having variable size and location cannot be provided from the live television signal 26, nor can such images therefore be overlayed on the live video signal with or without the addition of graphics and/or text in the composite video display 22.

Figure 11:
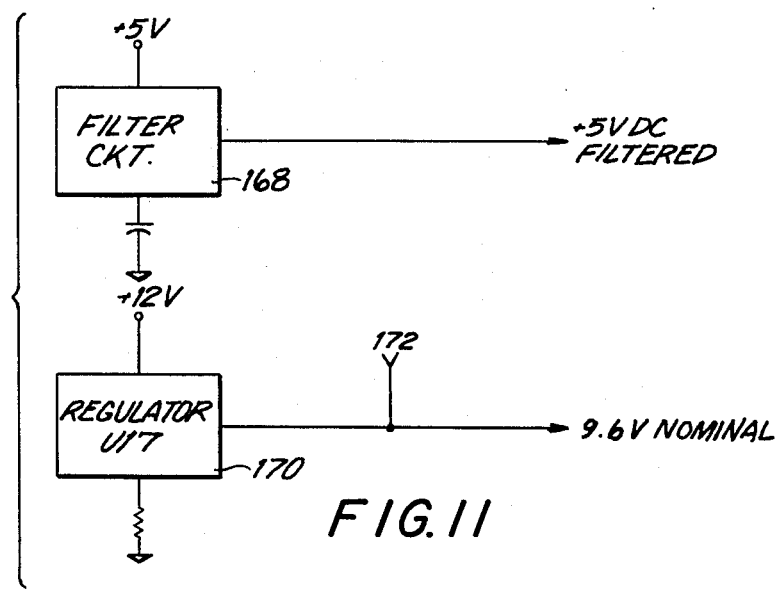
FIG. 11 is a schematic diagram, partially in block, of a power filter circuit for the system of the present invention.
Figure 12:
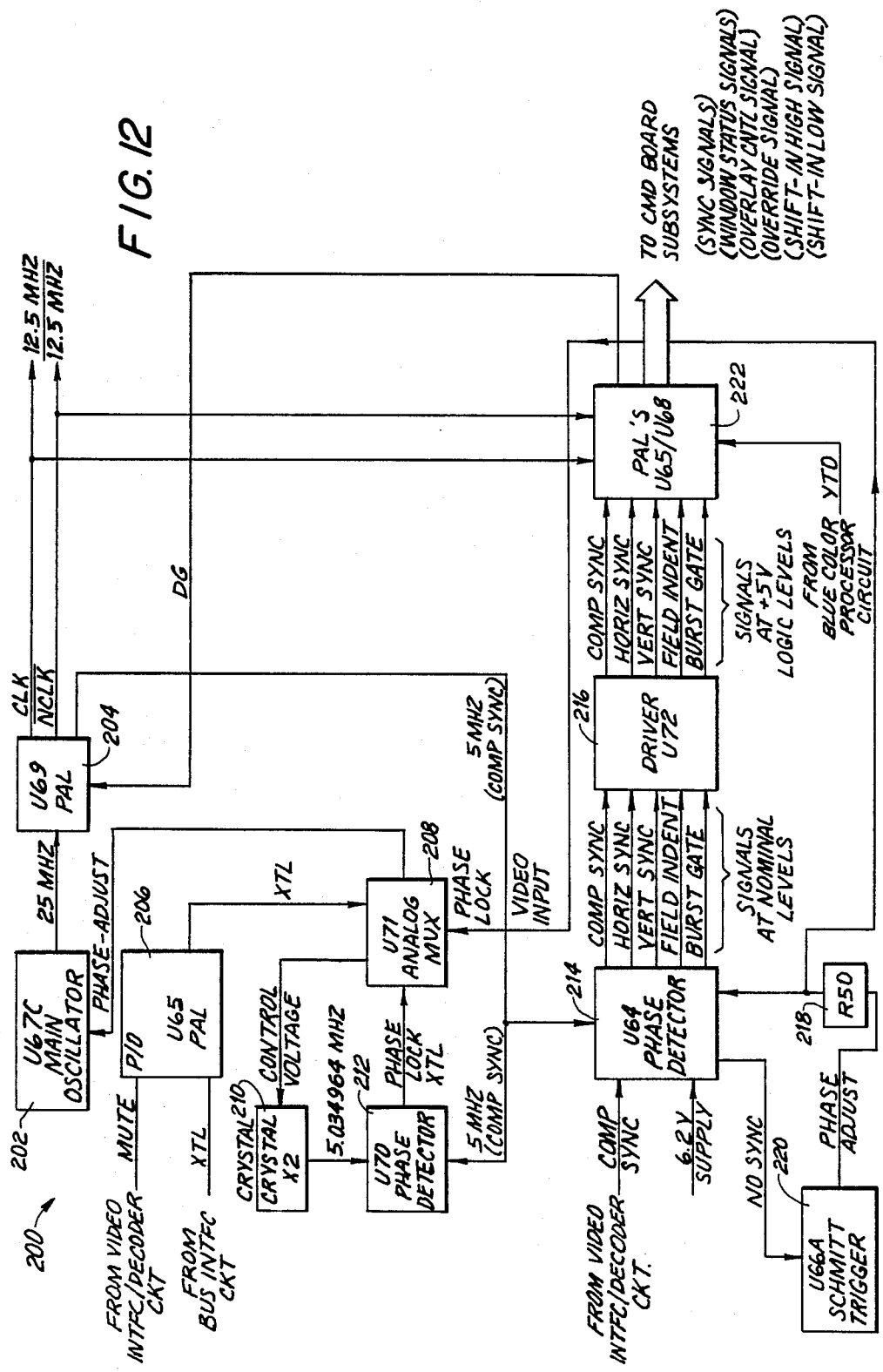
FIG. 12 is a functional block diagram of the video controller portion of the system of the presnnt invention.
Figure 13:
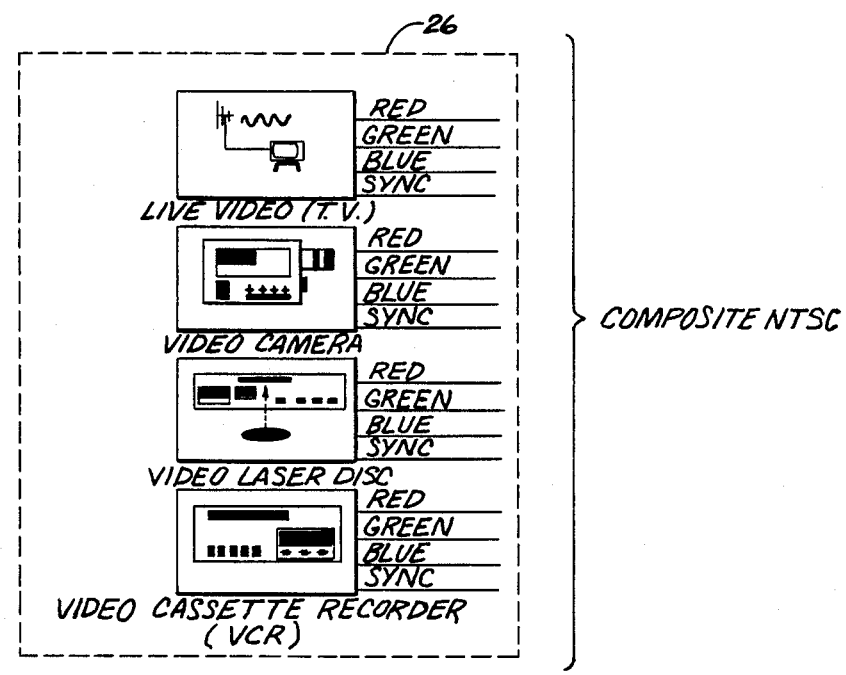
FIG. 13 is a diagrammatic illustration of the line TV signal source portion of the system of FIG. 2.

Referring now to FIGS. 2-12, the presently preferred system of the present invention for providing multiple, virtually unlimited variable windows of still video images, graphics and/or text along with full motion from any composite or RGB component video source, such as laser disks, still frame recorders, video cassette recorders, video cameras and live television signals 26, such as illustrated in FIG. 13, will be described. The system of the present invention will be described as one for preferably providing high resolution color images in which full motion color video images, such as live color television signals 26, may be instantly grabbed using the graphics coprocessor 20, which normally merely generates computer images on a television screen, at random by the user, digitized and stored as a full size video image, and manipulated to provide a variable size and location window for each grabbed image in the composite video display 22a in which the grabbed images are merged with text and/or graphics and/or full motion video, such as live television signals or television signals from any composite video source. Preferably, in order to enhance the color resolution as shown and preferred in FIG. 3, and as will be described in greater detail hereinafter, parallel processing of the color video signal in its red, blue and green components is employed, with the retrieved parallel processed red, blue and green components ultimately being recombined in the video output circuit 40 (FIG. 9), although if desired the components may be luminance and color difference signals. For the sake of clarity, the same reference numeral is used throughout for the same functioning component.

The image processing system of the present invention may preferably be implemented as a single slot, AT compatible image processing board which provides free flowing, real time digitalization of composite video and RGB analog video inputs, such as NTSC, PAL, SEACAM or other similar video formats. Real time full motion or moving video pictures, such as via closed circuit TV or VCR/VTR outputs or live television signals 26, can be displayed as real time full motion video pictures and captured as independent still frames or frozen video images, with a time base correction circuit preferably being incorporated into the image processing system of the present invention in order to maintain high quality for the captured or grabbed real time full motion video images.

Figure 5:
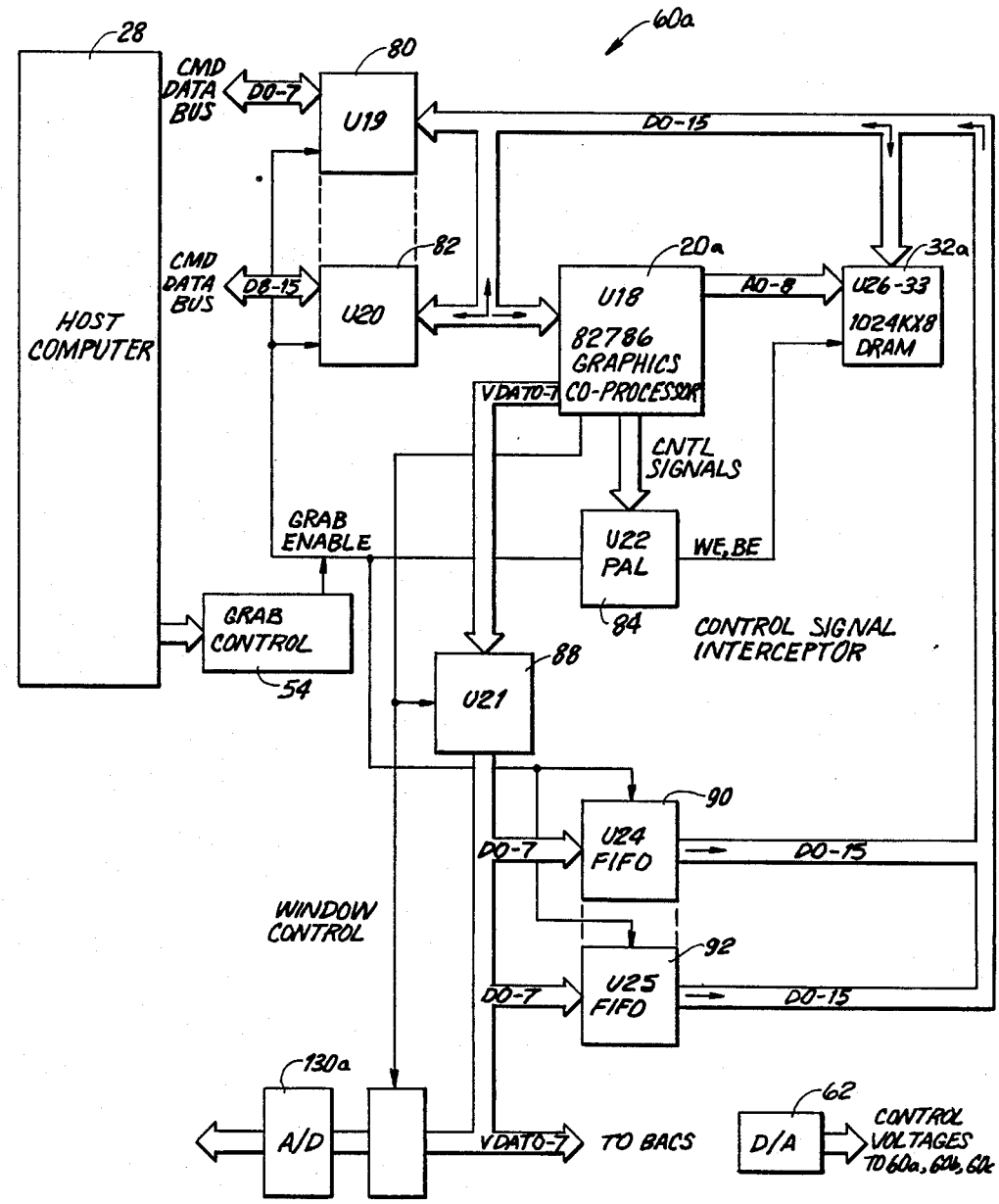
FIG. 5 is a more detailed functional block diagram of the embodiment of FIG. 2, illustrating a typical processing circuit in the system of the present invention.
Figure 14:
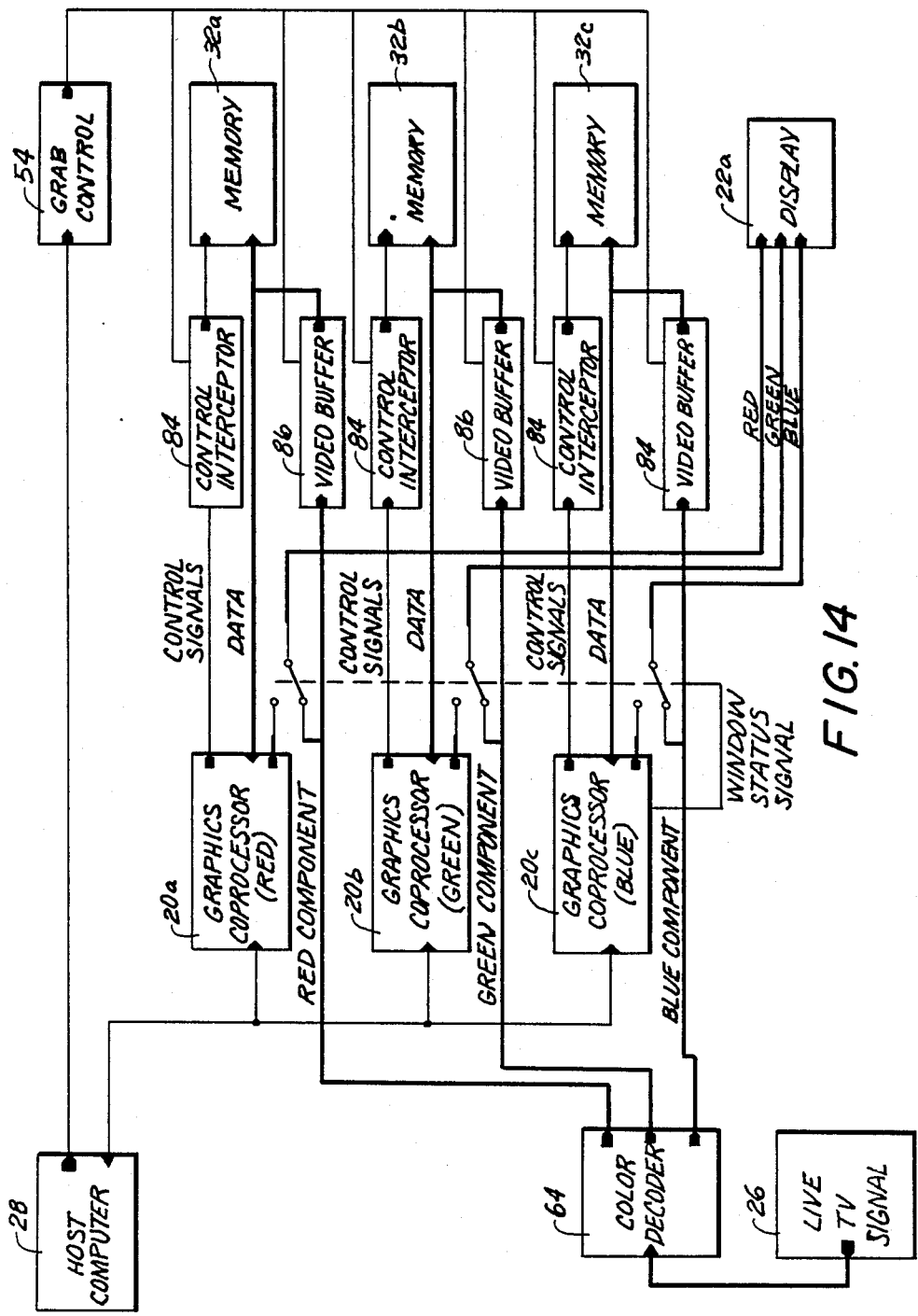
FIG. 14 is a detailed functional block diagram similar to FIG. 5, of the embodiment of FIG. 2, illustrating a complete R, G, B processing circuit in the system of the present invention.

As shown and preferred in FIGS. 5 and 14, three graphics coprocessors 20a, 20b, 20c, such as preferably three Intel 82786 graphics coprocessors, are utilized in the image processing system of the present invention to provide high resolution fast throughput of digitized video images. Fast throughput is preferably delivered by dedicating each of the three graphics coprocessors 20a, 20b, 20c to one of the three primary colors red, blue, green, thereby preferably providing parallel processing of video images. Of course, if a monochrome video signal is involved, then only one graphics coprocessor 20 would be needed, such as the typical configuration illustrated in FIG. 2. Each of the three color processing circuits which each preferably contain an 82786 graphics coprocessor 20a, 20b, 20c and a DRAM 32a, 32b, 32c, preferably contain at least one megabyte of storage capacity in each DRAM 32a, 32b, 32c. This quantity of memory may be any desired size depending on the desired storage capacity such as, by way of example providing for the storage of up to three maximum resolution images (668×480 pixels for example for an NTSC system and 668×575 for a PAL system) in the image processing system of the present invention. Of course, the images may be reduced in size, for example, from 668×480 pixels for an NTSC system to 334×240 pixels, with a resultant increase in the number of images which can be stored.

The resolution of compute generated images can preferably be modified to emulate CGA, EGA, and EGA+graphics and colors if desired. Multiple windows, such as up to 16 by way of example, can be defined and displayed on-screen, each with a different captured image. As previously mentioned, one of the windows may contain a full motion video image or windows can be displayed as overlays on a full screen real time moving or full motion video image in the composite display 22, and each window's size and contents can be independent of others displayed. Preferably, hardware windows allow horizontal and vertical scrolling of images and windows, and pixel zooming of up to 64 times is preferably supported. Preferably, other features of the image processing system of the present invention include a line and polygon drawing capability, such as, by way of example, at a speed of 2.5 million pixels per second, a circle drawing capability, such as, by way of example, at a speed of 2 million pixels per second, a solid area shading capability, such as, by way of example, at a speed of 3.75 million pixels per second, a block transfer capability, such as, by way of example, at a speed of 15 million bits per second, and a character drawing capability, such as, by way of example, at a speed of 1200 characters per second. Due to the use of three 82786 coprocessors 20a, 20b, 20c, a maximum palette of 16.7 million colors, is available for display. At any given time the number of colors from this maximum palette is determined by the number of pixels chosen. The video input is preferably composite video and the aforementioned time base correction circuit provides automatic sync correction for any composite video input source for ensuring high quality capturing and display of video images.

The image processing system of the present invention preferably digitizes composite or component RGB video input signals. Preferably the video images ar digitized as bit mapped screens, and, thus, the content of the video images, for example text, graphics or TV pictures, does not affect the image processing or the resolution of processed images. As a result, the image processing system of the present invention is an ideal medium for the digitalization, capturing, and display of video images, images which can include, by way of example, scanned documents, photographs, VCR outputs, VTR outputs, still frame recorder outputs, closed circuit TV outputs, live video, and any other composite video outputs available. Preferably, there are four subsystems which comprise the image processing system of the present invention; namely, the bus interface, the color processors, the video interface, and the video controller.

Figure 4:
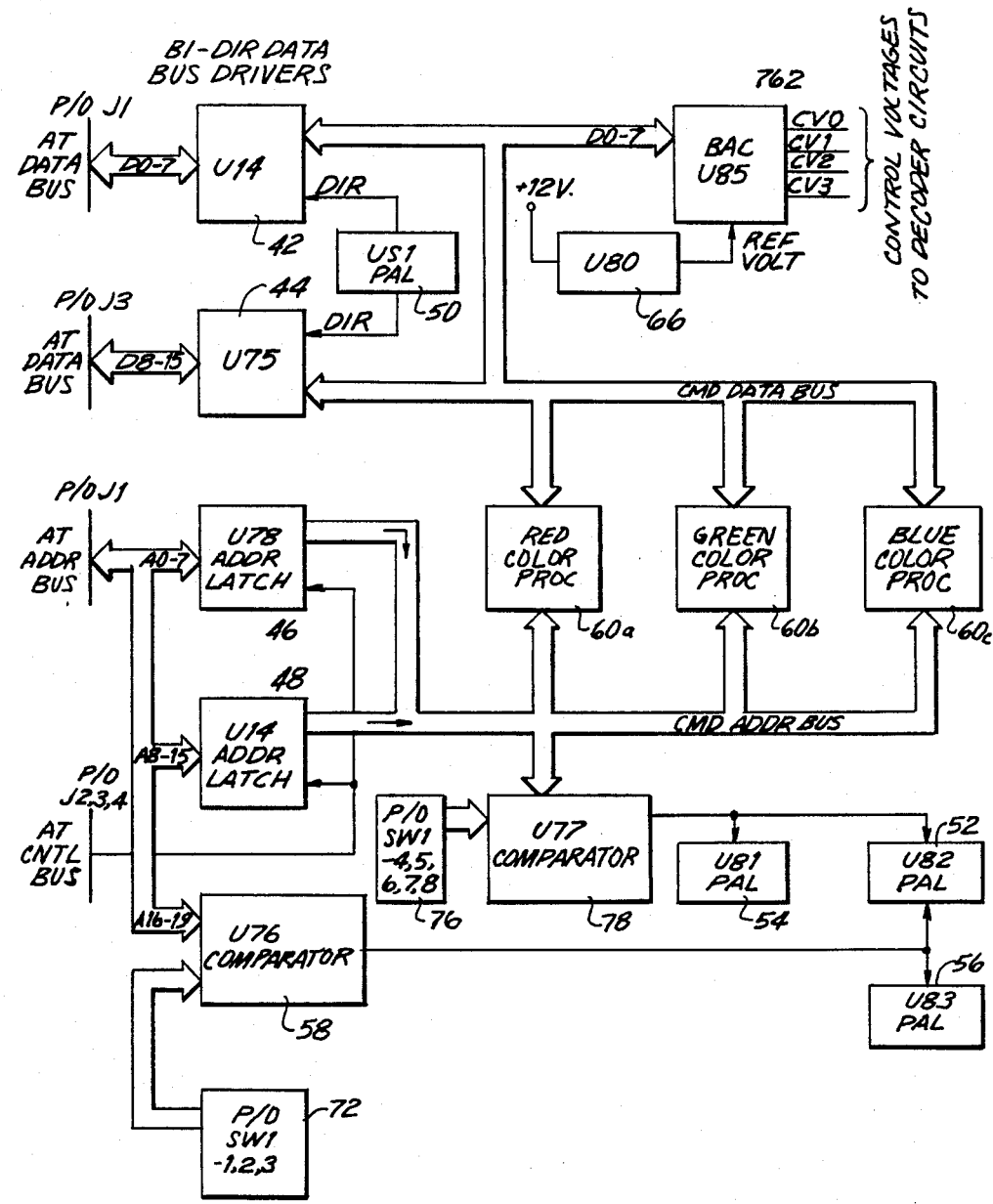
FIG. 4 is a functional block diagram illustrating the various bus interfaces between the image processing circuit of the present invention and the host computer's data, address, and control buses.

The bus interface, which is shown by way of example in FIG. 4, provides the interface between the image processing system of the present invention and the data, address, and control buses of the host compute 28. The bus interface circuit is preferably comprised of conventional bidirectional data bus drivers 42, 44, address bus latches 46, 48, programmable logic arrays 50, 52, 54, 56 and various associated control circuits. The bidirectional data bus drivers 42, 44 provides the interface between the host computer's 28 data bus and the data bus of the image processing system of the present invention. Driver 42 drives data bits 0–7 and driver 44 drives data bits 8–15. The direction in which the drivers 42, 44 are enabled is preferably controlled by programmable logic array 50 which interprets signals from the host computer's 28 control bus to select the desired data bus direction.

Programmable logic array 52 generates the four most significant bits of the addresses used by the color processor circuits 60a, 60b, 60c. In addition, this circuit 52 controls the type of access to be performed on the color processor circuits 60a, 60b, 60c; i.e., memory access or I/O access. Select signals generated by this circuit 52 also enable any combination of the color processor circuits 60a, 60b, 60c to perform read or write operations.

When the appropriate control signals have been generated by logic arrays 50 and 52, the data bus outputs of bus drivers 42 and 44 are enabled, thereby providing a path for the transfer of data between the image processing system's color processor circuits 60a, 60b, 60c and the host computer's 28 data bus. Address latches 46 and 48 provide the interface between the host computer's 28 address bus and the image processing system's address bus. Signal "BALE" (buffered address latch enable) from the host computer's 28 control bus is used to enable address latches 46 and 48. The remaining four address bits (Addr 16–19) of the host computer's 28 address bus are latched into comparator 58, which compares the state of these four address bits to the state of Switch 1-1, 2, 3, given reference numeral 72. Comparator 58 performs this comparison to detect when a memory access is being requested by the host computer 28. Signal "MAD" is generated by comparator 58 and sent to logic arrays 52 and 56. Similarly, address bits A3-9 are latched into comparator 78, which compares the state of these address bits to the state of Switch 1-4, 5, 6, 7, 8, given reference numeral 76.

As previously stated, logic array 50 uses the signal "MAD" as part of the logical inputs necessary to determine the direction in which bidirectional data bus drivers 42 and 44 will enable data transfers. Logic array 56 uses the signal "MAD" as part of the logical inputs to determine whether an interrupt must be sent to the host computer 28 for the initialization of a 16-bit data transfer, for example, or to disable signal "I/O Channel Ready," which will force the host computer 28 into a wait state during a data transfer and thereby provides enough time for the color processor circuits 60a, 60b, 60c to complete a data transfer.

Logic array 54 preferably has four functions. The first function is the generation of signal "SFTRS", a software selectable reset signal which is used to reset the graphics controllers or coprocessors 20a, 20b, 20c contained in the color processor circuits 60a, 60b, 60c, respectively. This software selectable reset is preferably "OR'd" with the host computer's 28 hardware "reset" signal. The second function of logic array 54 is the generation of signal "WDA" (write pulse), which is applied to D to A converter (DAC) 762 which generates the four control voltages used by the decoder circuits 64a, 64b, 64c. Converter 62 receives its reference voltage from regulator 66. The third function of logic array 54 is the enabling of the host computer 28 to rend the "Field Indent" (FI) and "Double Line Frequency" (D2) signals generated by the image processing system of the present invention. The fourth function of array 54 is the generation of signal "GRAB" which is used to enable the storage of a video frame.

As was previously mentioned with respect to FIGS. 5 and 14, by preferably dedicating individual color processing circuits 60a, 60b, 60c to each of the three primary colors, red, blue and green, a high speed, high quality image processing system is established, with each circuit 60a, 60b, 60c being dedicated to the processing of one of the three colors. A typical one of these color processing circuits, such as 60a by way of example, is shown in FIG. 5. As was previously mentioned each of the processing circuits 60a, 60b, 60c preferably contains a graphics coprocessor 20a, 20b, 20c, respectively, such as preferably the Intel 82786 graphics coprocessor. Digitized video images are sent to the graphics coprocessors 20a, 20b, 20c over the image processing system's data bus. Bidirectional data bus drivers 80, 82 act as selectable buffers to link the image processing system's data bus lines to the color processor circuit's 60a internal data bus. Logic array 84 is the control signal interceptor which, under control of the graphics coprocessor 20a, enables/disables drivers 80 and 82 when apropriate. In addition, interceptor 84 preferably generates signals "WE" (write enable) and "BE" (bus enable) which are used to control the storage and retrieval of data to and from the DRAM 32a, with each color processing circuit 60a, 60b and 60c each preferably containing its own DRAM 32a, 32b, 32c, respectively, such as a 1 Megabyte×8 bit DRAM. Address lines A0–A8 of the DRAM 32a are output by the graphics coprocessor 20a.

The control signal interceptor 84 enables video frame grabbing in the image processing system of the present invention. When the host computer 28 signals the grab control 54 to accept the live video, for example, the grab control enables both a live video buffer 86 (FIG.2) and the control signal interceptor 84. The live video buffer 86 preferably receives video information the entire time the image processing system is in operation, but does nothing with it until the Grab Control 54 is active. When the Grab Control 54 is active, the live video buffer 86 sends the video data to the memory 32a via the data bus (D0–D15). The control signal interceptor 84, as previously mentioned, changes the RD or read signal from the graphics coprocessor 20a to a WR or write signal and sends the write signal to the video memory 32a. The live video signal is then passed to the video memory 32a through the enabled video buffer 86 and stored as a digitized full size video frame of instantaneously grabbed video.

Video data outputs from the graphics coprocessor 20a (VDAT0-7) are preferably applied to selectable buffer driver 88 which receives its enable signal from the image processing system's control bus. When enabled, driver 88 passes the video data through to first-in-first-out (FIFO) buffers 90 and 92 or directly to the D to A converter 62a. Since buffers 90 and 92 are preferably 8 bit FIFO buffers, the first eight video data bits (VDO-7) are applied to buffer 90 and the second eight video data bits (VDO-7) are applied to buffer 92. Although the color processor circuits's 60a internal data bus contains sixteen data lines in the above example, the 82786 graphics coprocessor 20a outputs only eight video data bits at a time. This is why dual FIFO buffers 90 and 92 and their alternating accesses is preferably employed. Signals "SIL" and "SIH" control the selection of buffers 90 and 92 and are received from the image processing system's control bus. Preferably, in order to provide a display of real time full motion or moving video pictures without any noticeable delays, the image processing system of the present invention enables the FIFO buffers 90, 92 and the DRAM 32a to be directly by-passed. However, by nevertheless preferably passing or cycling the real time full motion or moving video picture through the image processing system of the present invention, these pictures are enhanced and time base corrected, thereby improving the quality of the real time moving video pictures.

FIFO buffers 90 and 92 , when enabled via signal "OE" from the image processing system's control bus, transfer stored video data via the Color Processor's 60a internal data bus to either the 82786 graphics coprocessor 20a directly or to the 1 Megabyte×8 bit DRAM 32a. This completes the loop of video storage and retrieval within each of the Color Processor circuits 60a, 60b, 60c. In order to better understand the flow of video data within each of the Color Processor 60a, 60b, 60c, the following operation shall be described below.

In normal operation, the 82786 graphics coprocessor 20a reads data from memory 32a using an interleaved "fast page mode" technique; data being read at approximately twice the rate that it will be displayed. The data is read in "bursts" and is buffered by internal FIFO buffers which can hold one-hundred and twenty-eight pixels. The 82786 graphics coprocessor 20a starts to read video data at the beginning of the horizontal blanking period and continues until the FIFO buffers are full, which occurs before the end of horizontal blanking. At the start of the active line period, pixels are taken from the FIFO buffers and transferred to the 1 Megabyte×8 bit DRAM 32a. When the FIFO buffers empty to a predetermined level, another memory access burst starts which continues until the FIFO buffers are full again. This process continues until the end of the displayed line.

Thus, the first memory access, after the start of a line, is to a memory location one-hundred and twenty-eight pixels onwards from the beginning of the memory map of the line. This method is used in the "grab" process by preferably defining a special "grab" mode memory map which consists of two tiles (vertical strips); the first tile consists of one-hundred and twenty-eight pixels from the right side of the picture, and the second is the remainder of the picture starting with the left edge.

Incoming video data is preferably buffed by an external FIFO buffer with the same depth as the Color Processor circuits's 60a internal FIFO buffers. Incoming video data is therefore arranged such that at the beginning of a line the external FIFO buffer is empty. As explained above, the internal FIFO buffer is full at this time. During the "frame grab", memory accesses are overridden to be "write" accesses so that each memory access represents one word "taken" from the external FIFO and one word "put into" the internal FIFO buffer. Similarly, each pixel of video represents one byte "taken out of" the internal FIFO and one byte "put into" the external FIFO (from the real time moving video source). Since the Video Controller circuit arranges the data flow so that the internal FIFO buffer does not overflow or underflow, it follows that the external FIFO buffer, which mirrors the internal FIFO buffer, starts out empty when the internal FIFO buffer is full, and therefore will not overflow or underflow either.

The internal FIFO buffer does not generally perform any useful function during the "grab" process but the control of its operation ensures that the external FIFO buffer operates correctly. In order for the handshaking between the external and internal FIFO buffers to work correctly, delays within the image processing system's subsystems must be accounted for. If the external FIFO buffer is the "fall through" type, then they cannot be completely emptied during the active line since several data words will always be moving through them from input to output. Since the internal FIFO buffers are completely filled at the end of each memory access burst, this would cause an underflow condition. This can be avoided by defining a further tile of field color at the left edge of the picture. The time taken to "display" this tile is chosen to be greater than the "fall through" time of the external FIFO buffer. Thus the external FIFO buffer runs ahead of the internal FIFO buffers by this time so that data is always available at the outputs of the external FIFO buffer when it is required. This extra tile, however, leads to two further considerations.

The first consideration is that it would appear that there is now a danger of the external FIFO buffer's overflowing, but this does not occur in practice because the internal FIFO buffers are never allowed to become much less than half full, and therefore the external FIFO buffer never gets much more than half full. The total FIFO buffer depth is one-hundred and twenty-eight pixels and a "dummy tile" of a sixteen pixel width is sufficient to overcome the "fall through" problem, thereby establishing a large safety margin.

The second consideration is what happens to the right edge of the memory map if an extra tile is put in at the left. The 82786 graphics coprocessor 20a continues to read data for the defined memory map, even if the memory map is larger than can actually be displayed; until blanking time. Memory accesses are always at least sixty-four pixels ahead so the extra tile can be accommodated.

When a frame is to be grabbed, the normal memory accesses for reading video data are preferably overridden to store video data instead. However, other types of memory accesses must also be considered in order to not cause any undesirable effects. The four types of normal memory accesses are RAM Refresh Cycles, Host Accesses, Graphics Coprocessor Accesses, and Display Processor Control Accesses.

The RAM Refresh Cycles generated by the 82786 graphics coprocessor 20a are "RAS only" cycles. In order for the memory devices to recognize such cycles it is only required that signal "CAS" be high; the state of signal "WRITE" is unimportant so no undesirable effects will result. However insofar as Host Accesses and Graphics Coprocessor Accesses, they must not be allowed to occur during a frame grab.

With respect to Display Processor Control Accesses, these occur at the beginning of each frame and at the end of each "strip.? "Write Overrides" must not occur during any of these accesses. The window descriptor is read immediately following signal "VSYNC" at the beginning of the first field. Signal "Override" is therefore preferably not asserted until the first line is displayed to avoid interference. For an interlaced picture, two "strips" are defined, one for the first field and one for the second. The first "strip" descriptor is read with the window descriptor. The second "strip" descriptor would preferably normally be read immediately after the video data for the last line in the first "strip." It is difficult to avoid overriding such a "read" so the "strips" are preferably modified slightly; an extra line being added to the first "strip" and a line being removed from the second "strip." The effect of this is that the first line "displayed" on the second field is in fact the first "strip." The second "strip" descriptor is then read at the end of the first line on the second field. It is easy to avoid overriding this "descriptor read" by denying the override signal at the "Vsync" signal following the first field and not asserting it again until the second line of the second field. Thus, the first line of the second field is preferably not grabbed. The first line of the first field is also preferably not grabbed in order to maintain symmetry. However, by increasing the number of lines "displayed" during a "grab," it would be possible to grab these lines, if desired.

Figure 9:
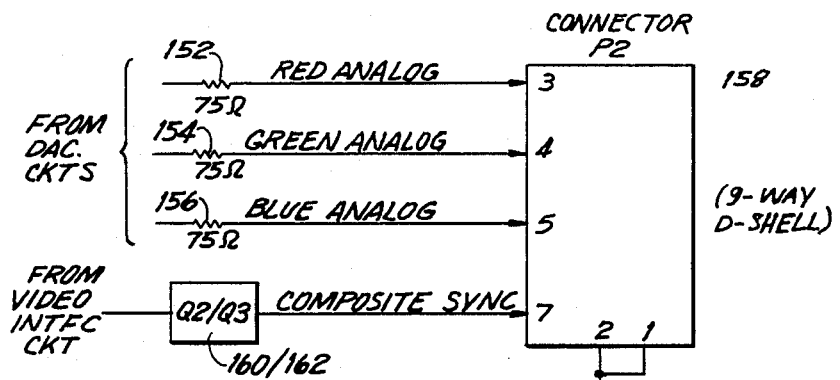
FIG. 9 is a schematic diagram, partially in block, of the video output circuit portion of the system of the present invention.
Figure 10:
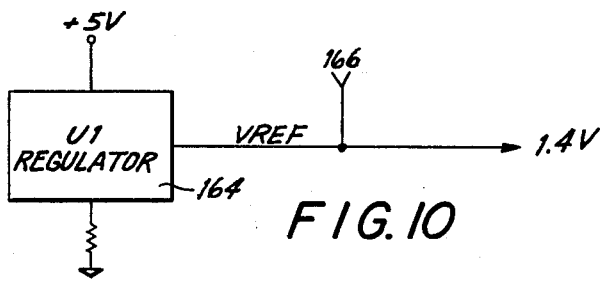
FIG. 10 is a schematic diagram, partially in block, of a reference voltage circuit for the system of the present invention.

Referring now to FIGS. 6–11, the video interface subsystem of the image processing system of the present invention shall now be described. The Video Interface subsystem itself is comprised of six subsystems; the Decoder circuit (FIG. 6), the Analog to Digital Converter circuit (FIG. 7), preferably the Digital to Analog Converter circuit (FIG. 8), the Video Output circuit (FIG. 9), the Reference Voltage circuit (FIG. 10), and the Power Filter circuit (FIG. 11).

Figure 6:
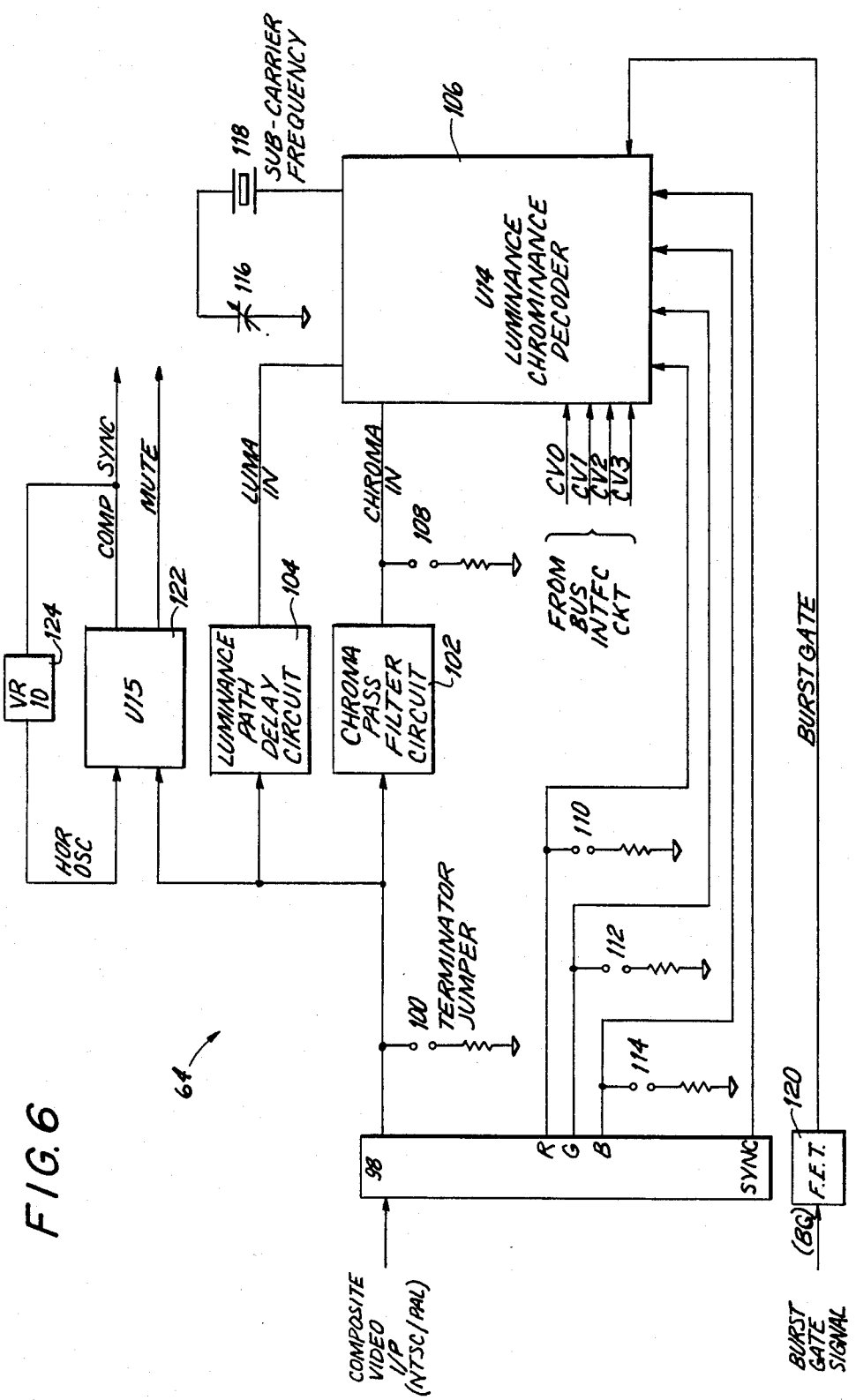
FIG. 6 is a functional block diagram, partially, in schematic, of the decoder circuit portion of the system of FIG. 3.

Referring initially to FIG. 6, the decoder circuit 64 shall be described. The composite or component RGB video input to the image processing system is via connector 98. When termination of this plug/input is required, a jumper 100 can be inserted. The composite or component RGB video input is applied directly from connector 98 to two distinct circuits; the Chroma Pass filter circuit 102 and the Luminance Path Delay circuit 104. The Chroma Pass Filter circuit 102 selects the chrominance component of the composite video signal. However, due to the delay inherent in the Chroma Pass Filter circuit 102, a delay must also be added to the Luminance path if proper synchronization is to be maintained. The Luminance Path Delay circuit 104, comprised of an inductor capacitor, and variable capacitor preferably develops the required delay to synchronize the chrominance and luminance paths.

Decoder 106 decodes the luminance and chrominance signals (from the composite or component RGB video input) to generate the red, green and blue components. Control voltages for brightness, contrast, color saturation and hue are provided from the bus interface circuit's D to A Converter 62. Jumper 108 is provided to select between the composite or component RGB video input from connector 98 or the Red, Green, Blue (RGB) and Sync inputs from connector 98. Adding jumper 108 disables the composite video input and enables the RGB/Sync inputs to be fed directly to decoder 106. Jumpers 110, 112, 114 are used to terminate the Red, Green, and Blue signal lines, respectively. Whenever a signal line (from connector 98) is not in use, and a terminating jumper exists for such a signal line, such a jumper shall preferably be installed to ensure the integrity of the selected input signal.

Variable Capacitor 116 is preferably used to adjust the sub-carrier oscillator frequency generated by Crystal 118. Field Effect Transistor (FET) 120 converts Burst Gate signal "BG" to a voltage level acceptable to decoder 106. In addition to the composite video signal being applied to decoder 106, the Chroma Pass Filter circuit 102, and the Luminance Path Delay circuit 104, the composite video signal is applied to another decoder 122, which separates the synchronizing (Comp Sync) signal from the composite video signal. Decoder 122 also generates a "Mute" signal which indicates whether or not a video input is connected. Variable Resistor 124 is preferably used to control the horizontal oscillator frequency input to decoder 122 via a sample of decoder's 122 "Comp Sync" signal.

There are preferably three identical Analog to Digital Converter (ADC) circuits 130a, 130b, 130c used in the image processing system of the present invention, one for each color signal (red, green, blue). As all three 130a, 130b, 130c are identical, the following description of the Red analog signal conversion circuit 130a, by way of example shall apply to all three. Referring now to FIG. 7, the Red analog signal (from th Decoder circuit 64) is applied first to Variable Resistor 132, which is used to adjust the voltage offset of the Red analog signal (herein referred to as the "analog signal"). The analog signal is then applied to Variable Resistor 134, which is used to adjust the voltage range of the analog signal. The purpose of these adjustments is to preferably make each color generate equal grey scale values. Jumper 136 is used to connect the analog signal input to a tuned circuit 138. This tuned circuit 138 rejects subcarrier signals and introduces loss for frequencies above the video band, thereby minimizing distortion of the analog signal input.

The output of Variable Resistor 134 is applied to Operational Amplifier 140, which maintains a low impedance drive for the ADC 142. The output of Operational Amplifier 140 is then applied to ADC 142. The output of ADC 142 is an 8 bit representation of the analog signal, and is preferably output directly to the image processing system's internal data bus. Clock signals generated internally by the image processing system are used to clock ADC 142, and are received directly from the image processing system's internal control bus. A Live Video Enable (LVEN) signal from the image processing system's control bus is used to enable the direct transfer of real time moving or full motion video pictures through the ADC 142 to the image processing system's data bus.

Similarly there are preferably three identical Digital to Analog Converter (DAC) circuits 62a, 62b, 62c in the image processing system one for each color (red, green, blue). As all three are identical, the following description of the Red DAC circuit 62a by way of example, shall apply to all three. Referring now to FIG. 8, DAC 144 preferably receives digital data corresponding to the Red composite signal from the image processing system's data bus. This data is preferably clocked into DAC 144 by a clock signal which is received from the image processing system's control bus. A Voltage Reference (VREF) signal is also preferably received from the image processing system's control bus and is applied to DAC 144. The analog output of DAC 144 is preferably applied to Buffer Amplifier 146, which provides for the proper impedance and voltage level of the Red analog signal output. Variable Resistor 148, is used to adjust the voltage offset of the Red analog signal output (Comp Out). A test point 150 is preferably provided at the output of Buffer Amplifier 146 for calibration routines if desired. The Red, Green, and Blue analog uutputs from each of the three DAC circuits 62a, 62b, 62c are directly linked to the Video Output circuit.

Referring now to FIG. 9, the video output circuit 40 preferably receives the Red, Green, and Blue analog output signals from the DAC circuits 62a, 62b, 62c and applies them through impedance matching resistors 152, 154, 156 to a conventional 9-way D-shell connector 158. The Composite Sync signal from the Video Interface Circuit is applied through low impedance driver transistors 160 and 162 to connector 158. Pins 3, 4, and 5 of connector 158 represent Red, Green and Blue analog signals, respectively. Pin 7 represents signal "Composite Sync." Pins 1 and 2 are tied to the image processing system's chassis/signal ground.

The Reference Voltage circuit is shown in FIG. 10 and preferably contains Regulator 164, which generates, by way of example, a 1.4 V DC reference voltage from the image processing system's +5 V DC line. A test point 166 may be provided for calibration routines, if desired.

The Power Filter Circuit is shown in FIG. 11 and preferably consists of two areas; a +5 V DC filter circuit 168 and a +120 V DC regulator circuit 170. The +5 V DC filter circuit 168 preferably maintains a constant current for the +5 V DC for the image processing system. The +120 V DC regulator circuit 170 is comprised of a Regulator which outputs a nominal voltage of, by way of example, +9.6 V DC. A test point 172 may be provided for calibration routines.

Now referring to FIG. 12, the video controller 200 portion of the image processing system of the present invention shall now be described. The Video Controller 200 contains the circuitry for synchronizing the operations of the image processing system and controlling the mixing of real time moving or full motion video pictures and captured/stored video pictures. The Video Controller 200 is preferably comprised of four subsystems; the Oscillator circuit the Synchronizing Signal Generation circuit, the Overlay Control circuit, and the Grab Control circuit, all of which are illustrated in FIG. 12. For purposes of clarity, these various subsystems shall be described in separate paragraphs below.

With respect to the Oscillator circuit, inverting Driver 202 generates the main oscillator frequency of, by way of example, 25 MHz. This main oscillator frequency is applied to logic array 204 which generates three clock signals; 12.5 MHz (CLK), 12.5 MHZ (NCLK*), and 5 MHz (CIN), by way of example. Array 204 generates these three clock signals by counting down from the main oscillator frequency received from oscillator 202.

In order to maintain a phase lock between the 12.5 MHz clock signals and the video input signals (Composite Video or RGB), a logic array 206 monitors signal "MUTE" from the Video Interface/Decoder circuit and signal "XTL" from the Bus Interface circuit. When either of these two signals becomes active, array 206 outputs signal "XTL" to Analog Muliplexer 208. Analog Multiplexer 208 then adjusts the control voltage which is being output to Crystal 210, and, upon receiving a phase lock signal from Phase Detector 212, outputs a "Phase-Adjust" signal to Main Oscillator 202. In this mode, the 12.5 MHz clock signals are phase locked to Crystal 210's output. When the "MUTE" and "XTL" signals are not active, the output of Crystal 210 is ignored, and Analog Multiplexer 208 instead phase locks the Main Oscillator 202 to the phase lock signal generated by Phase Detector 214, which receives its composite sync signal from the Video Interface/Decoder circuit.

With respect to the synchronizing signal generation circuit portion of the video controller 200, Phase Detector 214 generates the synchronizing signals for the image processing system. It is controlled by the 5 MHz clock signal from array 204. Phase Detector 214 preferably compares the Composite Sync signal from the Video Interface/Decoder circuit with its own internally generated line frequency. A voltage proportional to the phase difference between the Composite Sync signal and the internal line frequency is preferably output by Phase Detector 214 to Analog Multiplexer 208. In addition, Phase Detector 214 generates Composite Sync, Horizontal Sync, Vertical Sync, Field Indent, and Burst Gate signals. Because Phase Detector 214 utilizes a nominal supply voltage of +6.2 V DC, by way of example, the sync signals output are not at acceptable voltage levels for the image processing system. To compensate for this, Driver 216 receives Phase Detector 214's Sync outputs and drives them to +5 V DC logic levels. These Sync outputs are then applied throughout the image processing system's subsystems.

Preferably, to compensate for "Dead Time" coincidence, Resistor 218 provides a bias current which develops a slight offset from phase coincidence. To avoid erroneous lock to equalizing pulses, Phase Detector 214 outputs a "No Sync" signal to Schmitt Trigger 220, which then switches over and causes a shift in the Phase Lock signal sent to Analog Multiplexer 208. This changed Phase Lock signal is then applied to Main Oscillator 202 by Analog Multiplexer 208.

Should output timing uncertainty occur, the 5 MHz Composite Sync signal from array 204 is resynchronized to the 12.5 MHz clock signal input of 222. If the set up or hold time of the Composite Sync input to array 222 is too small, then timing jitter may occur. If this happens, signal "DG" will be output by array 222 to array 204. This adjusts the divider 204 for the 5 MHz clock signal so that the relative phase of the 5 MHz and 12.5 MHz clock signals are adjusted by one cycle of the 25 MHz Main Oscillator 202 clock signal. The edges of the 5 MHz and 12.5 MHz clock signals now become separated by 40 nanoseconds, by way of example.

With respect to the overlay control circuit portion of the video controller 200, using the outputs from Phase Detector 214, array 206 generates the horizontal and vertical synchronizing signals required by the 82786 graphics coprocessors of the Color Processor circuit 60a, 60b, 60c. Array 206 demultiplexes the Blue channel sync signals to extract the window status signals. Array 206 then preferably uses the least significant video data bit (VTO) from the Blue Color Processor circuit 626 to generate the overlay control signal (SVEN). The outputs of arrays 206 and 222 are then output to the image processing system's subsystems.

With respect to the grab control circuit, when a frame Grab is to occur, array 222 generates the override (OVR), the Shift-in High (SIH), and the Shift-in Low (SIL) signals used in the Color Processor circuits 60a, 60b, 60c.

For purposes of completeness and in order to better understand Port Addressing utilized within the image processing system of the present invention, the following system parameters are given by way of example below in TABLE 1.

TABLE 1

Addresses within the block are assigned as follows:

| Offset | Write Function | Read Function |
|--------|----------------|---------------|
| 0 | Contrast | Field Ident |
| 1 | Saturation | Double line signal |
| 2 | Brightness | Grab |
| 3 | Hue | |
| 4 | Memory Page | |
| 5 | Processor select | |
| 6 | Soft reset | |
| 7 | Crystal Lock | |

Locations 0 to 3 are written as 8 bit values.
Location 4 is as follows:
Bits 0 to 3   Top four address bits
bit 7         0 for memory address, 1 for register
Location 5 is as follows:
bit0          Select processor 0 (Red)
bit1          Select processor 1 (Green)
bit2          Select processor 2 (Blue)
It is possible to write to one or more processors but only one may be read at one time.
Location 6
To give a Soft reset write 1 then 0 to bit 7 of this location.
Location 7 bit 7
If 0 is written to bit 7 of this location then the video clock will lock to the input video signal if one is present. If there is no input video signal then the clock will be controlled by the internal crystal.
If 1 is written the bit then the clock will be crystal-locked whether a video signal is present or not. This is useful when it is desired to have a stable display (which does not include live video) and there is an unstable video input, such as from a rewinding VCR.
At location 0 bit 7 is read the odd/even field ident signal.
At location 1 bit 7 is read a double line frequency signal.
Reading location 3 causes a frame to be grabbed; no meaningfull value is read.

By utilizing the system of the present invention, a flexible image processing system is provided which enables full color image processing to provide video displays of text and/or graphics and/or still frame video and/or full motion video in a composite overlay display having multiple windows of still video images, graphics or text along with full motion video from any composite video source, such as live TV signals, laser disks, still frame recorders, video cassette recorders and video cameras. The frames of video to be grabbed may be grabbed at random and enhanced in size and color and inserted in variable size windows with each window being independent of the others.

What is claimed:

1. An image processing system capable of selectively merging graphics, text, digitized video frames and/or full motion video into a user selectable composite television display, said system comprising a composite or component RGB video input source means, said composite or component RGB video input source means comprising means for providing a full motion video input; a graphics coprocessor means capable of controllably retrievably storing digitized video frames for providing a user controllable variable window in an output composite television display picture; memory means operatively connected to said graphics coprocessor means for receiving memory control signals therefrom, said memory means having a data input/output means for inputting and outputting data therefrom and a control signal input means for enabling control of reading and writing from and to said memory means; control signal interception means operatively connected between said graphics coprocessor means and said control signal input means for controllably intercepting read memory control signals generated from said graphics coprocessor means and substituting write memory control signals therefor for providing said write memory control signals to said memory means control signal input means; grab control means operatively connected to said control interceptor means for controllably causing said interception of said read memory control signals during grabbing of a user selected full motion video signal input from said composite video input source means, said grab control means selectively substantially instantaneously grabbing said full motion video signal input in response to said user selection of a full motion video frame to be grabbed; video buffer means operatively connected to said data input/output means for controllably providing said grabbed user selected full motion video frame signal input to said memory means for retrievable storage of said grabbed user selected full motion video frame signal input, said grab control means further being operatively connected to said video buffer means for controlling said instantaneous grabbing of said user selected video frame signal input, said memory means retrievably storing said grabbed user selected video frame as a digitized video frame, said graphics coprocessor means enabling user manipulation of said stored grabbed user selected video frame for providing a still video image in said user controllable variable window in said output composite television display; and video switch and merging means for selectively merging said stored grabbed digitized video frames with said full motion video and/or graphics and/or text in said user selectable composite television display picture; whereby a flexible user controllable multimedia television image processing system is provided.

2. An image processing system in accordance with claim 1 wherein said memory means is capable of retrievably storing a plurality of different user selected grabbed digitized video frames.

3. An image processing system in accordance with claim 2 wherein said memory means is capable of retrievably storing said plurality of different user selected grabbed digitized video frames as full sized video frames.

4. An image processing system in accordance with claim 8 wherein said user controllable variable window is user controllable in both size and location in said output composite television display picture.

5. An image processing system in accordance with claim 4 wherein said full-motion video input comprises a live video signal input.

6. An image processing system in accordance with claim 3 wherein said full-motion video input comprises a live video signal input.

7. An image processing system in accordance with claim 2 wherein said graphics coprocessor means is capable of user manipulation of said plurality of different stored video frames and said video switch and merging means is capable of selectively merging a user selected plurality of said plurality of said stored grabbed digitized video frames with said full motion video, and/or graphics, and/or text in said user selectable composite television display for providing a user selectable composite television display comprising a user selectable plurality of windows of still video images, graphics and/or text and/or full motion video.

8. An image processing system in accordance with claim 7 wherein said memory means is capable of retrievably storing said plurality of different user selected grabbed digitized video-frames as full sized video frames.

9. An image processing system in accordance with claim 7 wherein each of said plurality of window in said composite television display is independently variable in size and content.

10. An image processing system in accordance with claim 7 wherein said full-motion video input comprises a live video signal input.

11. An image processing system in accordance with claim 7 wherein said composite or component RGB video input source means comprises video storage means.

12. An image processing system in accordance with claim 11 wherein said video storage means comprises laser disc means.

13. An image processing system in accordance with claim 11 wherein said video storage means cmprises video cassette recorder means.

14. An image processing system in accordance with claim 7 wherein said composite or component video input source comprises video camera means.

15. An image processing system in accordance with claim 7 wherein said video switch and merging means comprises host computer means operatively connected to said graphics coprocessor means and said grab control means for controlling the operation thereof in response to said user selection.

16. An image processing system in accordance with claim 15 further comprising color decoder means disposed between said full motion video composite or component RGB video input source means and said graphics coprocessor means for decoding said full motion video input into red, blue and green component video signals thereof, said graphics coprocessor means processing said red, blue and green component video signals in parallel for retrievably storing said user selected grabbed digitized video frame in its red, blue and green components, said video switch and merging means recombining said retrieved stored digitized red, blue and green components of said stored digitized video frame for providing a high resolution full color video output still video image therefrom in said user selectable variable window for said still video image in said output composite television display.

17. An image processing system in accordance with claim 16 wherein said full-motion video input comprises a live video signal input.

18. An image processing system in accordance with claim 16 wherein said composite or component RGB video input source means comprises video storage means.

19. An image processing system in accordance with claim 18 wherein said video storage means comprises laser disc means.

20. An image processing system in accordance with claim 18 wherein said video storage means comprises video cassette recorder means.

21. An image processing system in accordance with claim 16 wherein said composite or component RGB video input source comprises video camera means.

22. An image processing system in accordance with claim 16 wherein said memory means retrievably stores said grabbed user selected video frame as a full size digitized video frame.

23. An image processing system in accordance with claim 1 wherein said composite or component RGB video input source means comprises video storage means.

24. An image processing system in accordance with claim 23 wherein said video storage means comprises laser disc means.

25. An image processing system in accordance with claim 23 wherein said video storage means comprises video cassette recorder means.

26. An image processing system in accordance claim 1 wherein said composite or component RGB video input source comprises video camera means.

27. An image processing system in accordance with claim 1 wherein said video switch and merging means comprises host computer means operatively connected to said graphics coprocessor means and said grab control means for controlling the operation thereof in response to said user selection.

28. An image processing system in accordance with claim 27 further comprising color decoder means disposed between said full motion video composite video input source means and said graphics coprocessor means for decoding said full motion video input into red, blue and green component video signals thereof, said graphics coprocessor means processing said red, blue and green component video signals in parallel for retrievably storing said user selected grabbed digitized video frame in its red, blue and green components, said video switch and merging means recombining said retrieved stored digitized red, blue and green components of said stored digitized video frame for providing a high resolution full color video output still video image therefrom in said user selectable variable window for said still video image in said output composite television display.

29. An image processing system in accordance with claim 28 wherein said full-motion video input comprises a live video signal input.

30. An image processing system in accordance with claim 28 wherein said composite or component RGB video input source means comprises video storage means.

31. An image processing system in accordance with claim 30 wherein said video storage means comprises laser disc means.

32. An image processing system in accordance with claim 30 wherein said video storage means comprises video cassette recorder means.

33. An image processing system in accordance with claim 28 wherein said composite or component RGB video input source comprises video camera means.

34. An image processing system in accordance with claim 1 further comprising color decoder means disposed between said full motion video composite video input source means and said graphics coprocessor means for decoding said full motion video input into red, blue and green component video signals thereof, said graphics coprocessor means processing said red, blue and green component video signals in parallel for retrievably storing said user selected grabbed digitized video frame in its red, blue and green components, said video switch and merging means recombining said retrieved stored digitized red, blue and green components of said stored digitized video frame for providing a high resolution full color video output still video image therefrom in said user selectable variable window for said still video image in said output composite television display.

35. An image processing system in accordance with claim 34 wherein said full-motion video input comprises a live video signal input.

36. An image processing system in accordance with claim 34 wherein said composite or component RGB video input source means comprises video storage means.

37. An image processing system in accordance with claim 36 wherein said video storage means comprises laser disc means.

38. An image processing system in accordance with claim 36 wherein said video storage means comprises video cassette recorder means.

39. An image processing system in accordance with claim 34 wherein said composite or component RGB video input source comprises video camera means.

40. An image processin system in accordance with claim 1 wherein said user controllable variable window is user controllable in both size and location in said output composite television display picture.

41. An image processing system in accordance with claim 1 wherein said memory means retrievably stores said grabbed user selected video frame as a full size digitized video frame.

42. An image processing system in accordance with claim 41 wherein said user controllable variable window is user controllable in both size and location in said output composite television display picture.

43. An image processing system in accordance with claim 47 wherein said full-motion video input comprises a live video signal input.

44. An image processing system in accordance with claim 41 wherein said full-motion video input comprises a live video signal input.

45. An image processing system in accordance with claim 40 wherein said full-motion video input comprises a live video signal input.

46. An image processing system in accordance with claim 1 wherein said full-motion video input comprises a live video signal input.

* * * * *